United States Patent [19]

Balducci et al.

[11] 4,379,074
[45] Apr. 5, 1983

[54] CHEMICAL COMPOSITION BASED ON TITANIUM TRIHALIDE, A METHOD FOR ITS PREPARATION, AND A PROCESS FOR THE POLYMERIZATION OR COPOLYMERIZATION OF UNSATURATED COMPOUNDS WHICH USES THIS COMPOSITION

[75] Inventors: Agostino Balducci, San Donato Milanese; Margherita Corbellini, Milan; Mirko Osellame, Ombriano, all of Italy

[73] Assignees: Anic S.p.A., Palermo; Snamprogetti, S.p.A., Milan, both of Italy

[21] Appl. No.: 213,658

[22] Filed: Dec. 5, 1980

[30] Foreign Application Priority Data

Feb. 1, 1980 [IT] Italy ............................... 19619 A/80

[51] Int. Cl.³ ................................................ C08F 4/64
[52] U.S. Cl. ............................. 252/429 B; 252/429 C; 526/114; 526/115; 526/116; 526/122; 526/125; 526/144; 526/158
[58] Field of Search ........................ 252/429 B, 429 C

[56] References Cited

U.S. PATENT DOCUMENTS

| | | | |
|---|---|---|---|
| 3,094,568 | 6/1963 | Hay et al. ................ | 252/429 B X |
| 4,194,992 | 3/1980 | Corbellini et al. .......... | 252/429 C X |
| 4,203,866 | 5/1980 | Corbellini et al. .......... | 252/429 B X |
| 4,217,245 | 8/1980 | Corbellini et al. ............... | 252/429 B |

*Primary Examiner*—Patrick Garvin
*Attorney, Agent, or Firm*—Morgan, Finnegan, Pine, Foley & Lee

[57] ABSTRACT

This application relates to a process for the homopolymerization (or copolymerization) of unsaturated compounds, particularly ethylene and higher alpha olefines, to give homopolymers (or copolymers) having a wide molecular weight distribution.

The polymerization yields are very high, even at relatively low pressures (10 bars), i.e. such as not to require scrubbing in order to remove the catalytic residue from the polymer.

These results are obtained by using, in union with an organometallic aluminium compound, a catalyst in the form of a new titanium trihalide-based chemical composition satisfying the following formula:

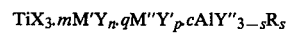

$$TiX_3 \cdot mM'Y_n \cdot qM''Y'_p \cdot cAlY''_{3-s}R_s$$

in which X is a halogen;
M' and M", which are different from each other, are metals chosen from Mg, Al, Ti, Zr, Mo, V, Mn, Cr, Fe and Zn;
Y, Y', Y", which are the same or different from each other, are halogens which can be the same as or different from X;
m and q can be zero or greater than zero, but cannot be both simultaneously equal to zero;
c is always greater than zero;
n and p represent the valencies of M' and M" respectively;
s can assume all values from 0 to 3; and R is a hydrocarbon radical.

4 Claims, No Drawings

CHEMICAL COMPOSITION BASED ON TITANIUM TRIHALIDE, A METHOD FOR ITS PREPARATION, AND A PROCESS FOR THE POLYMERIZATION OR COPOLYMERIZATION OF UNSATURATED COMPOUNDS WHICH USES THIS COMPOSITION

This patent application relates to a process for the homopolymerisation and copolymerisation of unsaturated compounds, particularly ethylene and higher alpha olefines, which uses a catalytic system consisting of an organometallic aluminium compound, together with a new titanium triahalide-based chemical composition which enables very high yields of polymers and copolymers having a wide molecular weight distribution to be obtained.

The U.S. Pat. No. 4,194,992 granted on Mar. 25, 1980 describes a method for preparing special titanium trichlorides modified by the presence of a chloride of a second metal chosen from Mg, Al, Ti, V, Cr, Mn and Fe, which are characterised by the fact that the ratio of the titanium to the second metal corresponds to the following stoichiometry:

$$nTiCl_3 \cdot MCl_n \quad (1)$$

where M represents one of the aforesaid metals and n its valency. According to said patent the titanium trichlorides, and in a parallel manner vanadium chlorides, are obtained by reacting the tetrachloride with vapour of the metal M. The aforesaid patent application describes a process for preparing formulations based on titanium trichloride and magnesium dichloride, in which however the Mg/Ti ratio exceeds the stoichiometry of formula (1), i.e. the Mg:Ti molar ratio always exceeds the value of 0.5 deducible from (1).

Subsequently, a further patent was granted on May 20, 1980 under the U.S. Pat. No. 4,203,866 which describes a method for preparing special compositions based on titanium trihalide and on halides of one or more metals other than magnesium, in which the molar ratio of these metals to the titanium always exceeds $1/n$, where n represents the metal valency, or the highest valency if more than one metal of different valencies are present simultaneously.

The aforesaid methods comprise vaporising the metal under vacuum, and reacting the vapour thus obtained with the titanium compound in the presence of a compound capable of donating halogen atoms. Suitable suggested halogen donors are inorganic halides (Sn Cl$_4$, Sb Cl$_5$, PO Cl$_3$, V Cl$_4$) and/or preferably organic halides of formula $C_{m'}H_{2m'+2-x}X_x$ in which X is a halogen, m' is a number between 1 and 18, and x is a number between 1 and 4.

It has now been found, and constitutes a subject matter of the present invention, that if formulations of the aforesaid type are brought into contact under particular conditions with an organometallic aluminium compound of formula $AlR'_{3-y}X_y$, where R' is a hydrocarbon radical, X a halogen and y a number between or equal to 0 and 2, new chemical compositions are obtained having the following general formula:

$$TiX_3 \cdot mM'Y_n \cdot qM''Y'_p \cdot cAlY''_{3-s}R'_s \quad (2)$$

in which
X is a halogen

M' and M'' are metals, different from each other, chosen from Mg, Al, Ti, Zr, Mo, V, Mn, Cr, Fe and Zn;

Y, Y' and Y'', which are the same or different from each other, are halogens and can themselves be the same as or different from X;

m and q can be zero or greater than zero, but cannot simultaneously both be equal to zero;

c is always greater than zero;

n and p are the valencies of M and M'' respectively;

s can assume all values from 0 to 3;

R' is a hydrocarbon radical preferably having a number of carbon atoms less than or equal to 10.

As stated, the chemical compositions of the aforesaid formula (2) are prepared by a multi-stage process. The first stage consists of vaporising the metal or metals M' and M'' under vacuum, and reacting the vapours thus obtained with a tetravalent titanium compound in the presence of the halogen atom donor. The metal is vaporised at a pressure of between 1 and $10^{-6}$ torr, at a temperature which varies between 300° and 2500° C. according to the metal. The reaction between the vapours obtained in this manner and the titanium compound in the presence of the halogen donor can take place either in the gaseous phase or in the liquid phase, at a temperature which can vary between $-150°$ and $+100°$ C. Suitable halogen donors are organic halides, particularly those of formula $C_{m'}H_{2m'+2-x}X_x$ where X is Cl or Br, m' represents a number between 1 and 18, and x a number between 1 and 4, or alternatively inorganic halides can be used which are able to exist in at least two oxidation stages in a valency stage greater than the minimum, such as Sn Cl$_4$, Sb Cl$_5$, PO Cl$_3$, V Cl$_4$.

The titanium compound can be chosen from a wide range of derivatives, for example titanium halides, alcoholates, halogen alcoholates.

The vapour reaction can be carried out in the presence of an organic diluent chosen from aliphatic or aromatic hydrocarbons. If organic halogen donors are used, these can act as diluents. The product obtained in the described first stage is brought into contact, in a subsequent stage, with an organometallic aluminium compound of formula $AlR'_{3-y}X_y$, wherein y is a number from 0 to 2 at a temperature of between $-150°$ C. and $+100°$ C., preferably between $-70°$ and $+30°$ C. The final compound, of formula (2), has a molar Al/Ti ratio of between 0.5 and 50, and is thought to be of use in numerous useful applications.

Its use as a component of catalytic systems in the polymerisation and copolymerisation of unsaturated compounds has proved particularly effective, and this constitutes the second subject matter of the present invention.

In this respect, it has been found possible to prepare polymers or copolymers of alpha olefins and preferably ethylene, by carrying out the polymerisation reaction in the presence of a catalytic system composed of an aluminium derivative of formula $AlR''_pX_{3-p}$, where R'' is a hydrocarbon radical, X a halogen and p is a number between 1 and 3, together with the final compound heretofore defined.

The polymerisation can be carried out in the presence of a hydrocarbon solvent at a temperature of between 20° and 200° C. and at a pressure of between 1 and 60 atmospheres. Alternatively, the polymerisation can be carried out by feeding the monomer or monomers in their gaseous state directly over the catalyst. Finally, in the case of ethylene and its copolymers with alpha olefines, the results are extremely interesting in that very high yields are obtained of polymers having a wide molecular weight distribution, as is verified by the (Mw/MN) date.

These polymers and copolymers are suitable for extrusion (tubes) and below mouldings.

The yields are decidedly high, of the order of $10^6$ g/g of titanium at a relatively low total pressure (10 bars).

EXAMPLE 1

Preparation

The catalyst is prepared in a metal vaporisation apparatus consisting of a rotating flask, at the centre of which is disposed a tungsten filament wound in the form of a coil and connected to an electricity supply.

Below the flask, which is disposed horizontally, there is placed a cold bath.

The top of the apparatus comprises a connector for nitrogen and for vacuum.

2.90 g of magnesium wire, equal to 120.8 mg at are wound about the tungsten coil, which is protected by a quartz tube.

250 cm$^3$ of dehydrated n-heptane, 0.44 cm$^3$ of Ti Cl$_4$ (equal to 4.00 mM) and 33.5 cm$^3$ of 1-chlorohexane (equal to 243.6 mM) are fed into the flask. The flask is cooled to $-70°$ C., a vacuum of $10^{-3}$ torr is applied, and the coil is then heated so as to vaporise the metal. A black precipitate forms. At the end of vaporisation (about 20 minutes), nitrogen is fed into the apparatus, and 6.2 cm$^3$ of a 1.3 molar solution of aluminium sesquichloride (Et$_3$ Al$_2$ Cl$_6$) in heptane, equal to 8.06 mM of Al, are added to the still cold suspension.

The flask is returned to ambient temperature, and is then heated to 85° C. for two hours.

Analysis of the suspension gave the following molar ratios:

Mg/Ti=25; Al/Ti=2.2.

Polymerisation

A 5 liter autoclave free from air and moisture and fitted with an anchor stirrer is fed with 2 liters of anhydrous, deaerated n-heptane, 6 mM of Al (iBu)$_3$ and a quantity of catalyst, prepared in accordance with the aforesaid example, equal to 0.008 mg at of metal titanium. The temperature is raised to 85° C., and hydrogen is fed at a pressure of 1.7 bars, plus an ethylene/1-butene mixture (1.5% C$_4$) until a total pressure of 5 bars is attained. The feed of ethylene/1-butene is contained in order to maintain the total pressure constant for 2 hours. 380 g of copolymer are obtained, equal to a specific activity of 137,000 g of polymer per g of titanium per hour of reaction per atmosphere of ethylene.

The polymer characteristics are as follows:
melt flow index with load of 2.16 kg (MFI 2.16, ASTM D 1238/A) 0.11 g/10 min; density (ASTM D 1505) 0.9510 Mg/m$^3$ (megagrams—$10^6$ grams); shear rate $\gamma_c$ (ASTM D 1703) 420 sec$^{-1}$; polydispersity index (Mw/Mn) determined by GPC) 12.0.

Using the same procedure as described heretofore, but with a hydrogen pressure of 2.1 bars and only ethylene, 370 g of polyethylene are obtained equal to a specific activity of 150,000 g of polymer per g of Ti per hour per atmosphere of ethylene.

The product characteristics are as follows:
MFI$_{2.16}$ 0.25 g/10 min; d 0.9710 Mg/m$^3$; $\gamma_C$ 1,000 sec$^{-1}$; (Mw/Mn) 13.0.

EXAMPLE 2

Preparation

The catalyst is prepared as described in example 1. 2.25 g of an alloy of 6% Al in Mg, equal to 88.3 mg at of Mg and 5.0 mg at of Al, are wound about the tungsten coil. 250 cm$^3$ of anhydrous deaerated n-heptane, 27 cm$^3$ of 1-chlorohexane, equal to 196.3 mM, and 0.30 cm$^3$ of Ti Cl$_4$, equal to 2.7 mM, are fed into the flask under nitrogen.

At the end of vaporisation (about 15 minutes), nitrogen is fed into the flask, which is allowed to come to ambient temperature.

It is then heated for 2 hours at 85° C. by means of a temperature-controlled oil bath.

Analysis shows the following molar ratios:
Mg/Ti 28; Al/Ti 1.7.

Polymerisation 2 liters of anhydrous deaerated n-heptane, 6 mM of Al (iso Bu)$_3$ and a quantity of catalyst equal to 0.008 mg at of titanium are fed into a 5 liter autoclave fitted with an anchor stirrer.

The temperature is raised to 85° C., hydrogen is fed to a pressure of 1.7 bars, and a mixture of 1.2% of 1-butene in ethylene to a pressure of 3.6 bars.

The feed of the ethylene/1-butene mixture is contained in order to maintain constant pressure for a period of 2 hours. 385 g of polyethylene are obtained having an MFI of 0.11 g/10 min; $\gamma_c=155$ sec$^{-1}$, and d=0.9556 Mg/m$^3$.

The polymer has a polydispersity index (Mw/Mn) of 4.0. The specific activity is 140,000 g of polyethylene per g of Ti per hour per atmosphere of ethylene.

EXAMPLE 3

Preparation

The same apparatus is used as in example 1.

2.50 g of an Mg alloy containing 6% by weight of Al, equal to 97.9 mg at of Mg and 5.56 mg at of Al, 28.5 cm$^3$ of 1-chlorohexane, equal to 207.2 mM, and 0.35 cm$^3$ of TiCl$_4$, equal to 3.46 mM, are fed into the apparatus.

5.38 cm$^3$ of a 1.3 M solution of aluminium sesquichloride in heptane, equal to 7.0 mg at of Al, are fed into the flask at the end of vaporisation, and at a temperature of $-60°$ C. The procedure described heretofore is then carried out.

Analysis gives:
Mg/Ti=28; Al/Ti=2.7.

Polymerisation

Under the conditions of example 1, 405 g of polyethylene were obtained having an MFI of 0.10 g/10 min, $\gamma_c$ of 400 sec$^{-1}$, d of 0.9552 Mg/cm$^3$ and Mw/Mn of 10.2.

The specific activity is 145,000 g of polyethylene per g of Ti per hour per atmosphere of ethylene.

EXAMPLE 4

Preparation

The same apparatus is used as in example 1. 2.1 g of Mg, equal to 87.0 mg at of Mg, 250 cm$^3$ of n-heptane, 25.1 cm$^3$ of 1-chlorohexane, equal to 182.5 mM, and 0.32 cm$^3$ of TiCl$_4$, eual to 2.91 mM, are fed into the apparatus.

21.3 cm$^3$ of a solution of aluminium sesquichloride in heptane, equal to 27.7 mM are added at the end of vaporisation, and the process continued as in the case of the sample of example 1.

Analysis:
Mg/Ti=24; Al/Ti=9.6.
Polymerisation

The same apparatus as in example 1 is used.

Operating under the same conditions, 360 g of a polymer are obtained having an MFI of 0.16 g/10 min, $\gamma_c$ of 600 sec$^{-1}$, d of 0.9567 Mg/m$^3$, and Mw/Mn of 9.3. The specific activity is 130,000 g of polyethylene per g of Ti per hour per atmosphere of ethylene.

EXAMPLE 5

Preparation

The same apparatus is used as in example 1.

2.86 g of Mg, equal to 119 mg at of Mg, 250 cm$^3$ of anhydrous deaerated n-heptane, 32 cm$^3$ of 1-chlorohexane, equal to 236.2 mM, and 0.40 cm$^3$ of TiCl$_4$, equal to 3.64 mM, are fed into the apparatus.

At the end of vaporisation, 7.0 cm$^3$ of a 1.3 M solution of aluminium sesquichloride in heptane are added.

The sample is then processed as in the case of the sample of example 1.

Analysis gives:
Mg/Ti=26; Al/Ti=2.5.
Polymerisation

The apparatus and method of example 1 are used, however with the difference that a mixture of 1.9% propylene in ethylene is fed. 370 g of polyethylene are obtained having an MFI of 0.08 g/10 min, $\gamma_c$ of 350 sec$^{-1}$, d of 0.9465 Mg/m$^3$ and Mw/Mn of 9.5. Its specific activity is 135,000 g of polyethylene per g of Ti per hour per atmosphere of ethylene.

EXAMPLE 6

Preparation

The same apparatus is used as in Example 1.

2.40 g of Mg wire, equal to 100.00 mg at, 250 cm$^3$ of anhydrous deaerated n-heptane, 0.37 cm$^3$ of TiCl$_4$, equal to 3.37 mM, and 11.87 cm$^3$ of SnCl$_4$, equal to 100.3 mM, are fed into the apparatus.

At the end of vaporisation, 5.2 cm$^3$ of a solution of aluminium sesquichloride in heptane, equal to 6.76 mg at of aluminium, are added.

The sample is then processed as described in Example 1.

Analysis gives:
Al/Ti=2.1, Mg/Ti=26, Sn/Ti=25.
Polymerisation

The same apparatus is used as described in example 1.

Operating under the same conditions, 410 g of polyethylene are obtained having an MFI of 0.09 min, d of 0.9516 Mg/m$^3$, and $\gamma_c$ of 810 sec$^{-1}$.

The polymer has a polydispersity index (Mw/Mn) of 8.0.

Its specific activity is 150,000 g of polyethylene per g of Ti per hour per atmosphere of ethylene.

EXAMPLE 7

Polymerisation 10 g of powdered polyethylene having a particle size of less than 104 μm, 50 cm$^3$ of anhydrous deaerated n-hexane, and 1.5 mg at of aluminium triisobutyl are fed into a double neck flask under a nitrogen flow.

After homogenisation it is left standing for 2 hours, after which 0.008 mg at of catalyst such as titanium prepared as described in example 1, and 1.5 mg at of Al (iso Bu)$_3$ are added under a nitrogen flow.

The hexane is completely removed by vacuum distillation at 60° C.

The material prepared in this manner is fed under nitrogen into a 2 liter autoclave which has been properly dried, deaerated and kept under nitrogen. Vacuum is applied to the autoclave in order to remove the nitrogen, after which hydrogen is fed to a pressure of 0.5 bars gauge. The temperature is raised to 80° C., then ethylene is fed in order to keep the pressure constant at 3.5 bars.

After 3 hours of polymerisation, 75 g of polymer are obtained having an MFI$_{2.16}$ of 0.22 g/10 min, $\gamma_c$ of 600 sec$^{-1}$, d of 0.9640 Mg/m$^3$, and Mw/Mn of 10.

The yield was 21,700 g of polyethylene per g of Ti per hour per atmosphere of ethylene.

We claim:

1. A catalyst system consisting of: (a) a compound of the formula:

$$TiX_3 \cdot mM'Y_n \cdot qM''Y'_p \cdot cAlY''_{3-s}R'_s$$

in which X is halogen, M' and M'' are metals different from each other, selected from the group consisting of Mg, Al, Ti, Zr, Mo, V, Mn, Cr, Fe and Zn; Y, Y' and Y'', the same or different from each other, are halogens and can be the same as or different from X, m and q can be zero or greater than zero, but cannot be both zero simultaneously, c has a value between 0.5 and 50; n and p represent the valencies of M' and M'' respectively; S has a value from 0 to 3; and R' is a hydrocarbon radical having a number of carbon atoms less than or equal to 10, in combination with (b) a compound of the formula:

$$AlR''_p X'_{3-p'}$$

in which R'' is a hydrocarbon radical, X' is halogen and p' is a number between 1 and 3.

2. A process for preparing a a catalyst system as claimed in claim 1, comprising
   (a) vaporizing under a vacuum the metal or metals indicasted in claim 1 by M' and M'', reacting the vapours thus obtained with a titanium compound in the presence of a halogen donor,
   (b) treating the product with an organometallic aluminium compound of formula AlR'$_{3-y}$X$_y$, in which R' is a hydrocarbon radical, X a halogen and y a number lying between or equal to 0 and 2, and
   (c) combining the resulting product with a compound of the formula AlR''$_p$X'$_{3-p'}$, in which R'' is a hydrocarbon radical, X' is halogen and p' is a number between 1 and 3.

3. A process as claimed in claim 2, wherein the treatment with the organometallic aluminium compound specified therein is carried out at a temperature of between −150° C. and +100° C.

4. A process as claimed in claim 3, wherein the treatment with the organometallic aluminium compound specified therein is carried out preferably at a temperature between −70° C. and +30° C.

* * * * *